June 5, 1956 B. E. FRIER 2,749,497
DYNAMIC BRAKING CONTROL SYSTEM
Filed June 21, 1952
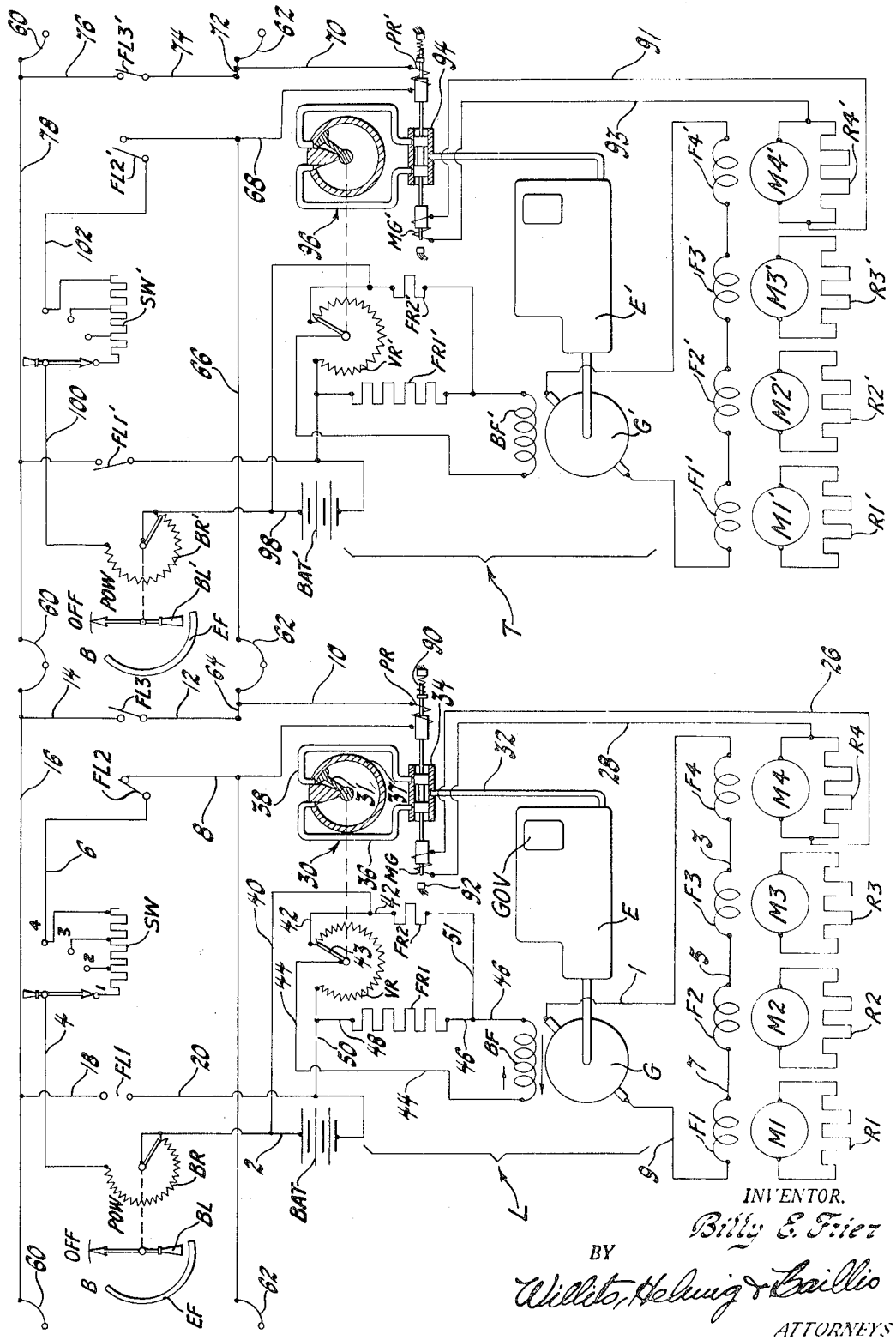
INVENTOR.
Billy E. Frier
BY
Willets, Helming & Baillio
ATTORNEYS United States Patent Office 2,749,497
Patented June 5, 1956

2,749,497

DYNAMIC BRAKING CONTROL SYSTEM

Billy E. Frier, Naperville, Ill., assignor to General Motors Corporation, Detroit, Mich., a corporation of Delaware Application June 21, 1952, Serial No. 294,862

3 Claims. (Cl. 318—367)

At the present time more and more diesel electric locomotive are being equipped with dynamic braking. The reason for this greater use is mainly one of cost. It has been found that savings in the cost of replacing and maintaining the mechanical brake equipment on locomotives equipped with dynamic braking has greatly exceeded the cost of installing and maintaining this dynamic braking equipment. The control systems of these dynamic braking systems, however, are the subjects of certain basic objections, and it may be stated at this point that it is broadly one of the objects of this invention to overcome these basic objections.

In order to fully understand the objections categorically mentioned in the preceding paragraph, it is felt that a brief description of a diesel electric locomotive should be given including the present dynamic type braking system employed with its specific limitations.

In general, the present type diesel electric locomotive includes a diesel engine which supplies power to turn a main direct current generator. This generator in turn supplies electrical power to one or more electrical traction motors which are geared to axles provided with traction wheels for moving the locomotive. It was early discovered that if the locomotive was moving, braking could be achieved by disconnecting the traction motor armatures from their power source, namely, the main generator, connecting them across high resistances commonly known as resistor grids and dissipating the heat generated thereby. It will be appreciated that these traction motors when so connected are no longer functioning as electrical motors but rather as generators which are turned by the momentum of the locomotive and the frictional forces acting between the traction wheels and the rails on which they roll. In order to accomplish the above result, it will be remembered that there must be some means for exciting the fields of the traction motors. In present systems this is done by connecting the fields of the traction motors in series across the main generator. The generator itself is excited by a main battery field connected across a low voltage source such as a battery. A certain degree of dynamic braking control may now be achieved by placing a variable resistance operated by a brake control lever in series with the battery field of the main generator and across the battery.

It will be observed that the system just described and currently in use on Diesel electric locomotives is deficient in the following respects:

First, it does not limit the maximum grid current which for any particular brake setting is a function of locomotive speed. This is considered a serious defect in the present system because the grid current is the same as the current that flows through the traction motor armature and if on any particular brake control setting the speed of the locomotive should exceed a certain amount, the grids might be damaged by the excessive current flow and the heat resulting from such excessive current flow.

Second, since the grid current is proportional to locomotive speed, this limits the degree of brake lever control at medium and high speeds and necessitates a change of setting with a change of locomotive speed. In other words, if the present systems are operating at high locomotive speeds, the brake lever must be placed in a low braking position, and if the speed increases, a further change to a lower brake lever setting must be made.

Third, braking effort cannot be increased at speeds below the maximum braking effort point, as maximum battery field current is already being used up to that point.

Fourth, the residual voltage of the main generator prevents the engineer from going from power to braking in less than ten seconds without the possibility of damage to the braking grids, and to grid fans and the fan motors which are provided to cool the grids. The reason for this is that if braking is accomplished in less than ten seconds, the residual voltage in the generator causes over-excitation of the traction motor fields and excessive current to flow through the grids.

It, therefore, becomes an object of this invention to provide a dynamic braking system which limits the maximum dynamic braking grid currents.

It is another object of this invention to provide a dynamic braking system which allows an unlimited degree of brake lever control at medium and high speeds and does not necessitate change of setting for change of locomotive speed.

It is another objects of this invention to provide a dynamic braking system which allows braking effort to be increased at speeds below the maximum braking effort point.

It is a further object of this invention to provide in a dynamic braking system means for quickly reducing the residual voltage of the main generator to allow the operator of a locomotive to go from power to braking without any delay.

It is a further object of this invention to provide a dynamic braking system control which is simple to operate and which will readily adapt itself to dynamic braking systems currently in use on locomotives today.

It is a further object of this invention to provide a simplified dynamic braking system which automatically controls the grid current without regard to locomotive speeds and which does not require manual adjustment by an operator of a locomotive with changes in locomotive speeds.

The drawing is a schematic diagram showing the new improved dynamic braking control systems employed on two locomotive units connected in multiple. One of these locomotive units is designated generally by the letter L indicating a leading unit, and the second of the locomotive units is designated generally by the letter T, indicating a trailing unit. The description of the new improved dynamic braking system will proceed primarily with the L unit, the T unit being shown only to illustrate how similar units may be connected in multiple.

Referring now to the schematic portion of the diagram designated generally by L, a diesel engine E having a governor GOV is shown driving a main direct current generator. G. Connected in series across the armature of the generator G by conductors 1, 3, 5, 7 and 9 are field windings F1, F2, F3 and F4 for four traction motor armatures M1, M2, M3, and M4, respectively, and connected across each of the traction motor armatures M1, M2, M3 and M4, are resistor grids R1, R2, R3 and R4. The generator G is excited by a battery field BF connected in an electrical circuit with a battery BAT in a manner later to be described. Also shown connected to the positive and negative sides of the battery BAT is an electrical circuit including a conductor 2, a braking resistor BR, a conductor 4, a unit selector switch SW, a conductor 6, a field loop switch FL2, a conductor 8, the coil of a solenoid PR, a conductor 10, a conductor 12, a field loop switch FL3, a conductor 14, a conductor 16, a conductor 18, a field loop switch FL1, and a conductor 20.

The braking resistor BR is a variable resistance of well known construction having an arm operatively connected to a braking lever BL. The braking lever BL has a power position POW, an off position OFF, a braking position B, and a series of braking effort positions designated generally by EF. The braking lever BL is a manually operated lever and is moved to its various positions by the locomotive engineer.

The unit selector switch SW is a manually controlled variable resistance having a plurality of selector positions with which the selector arm may make contact. The purpose of the unit selector switch is to keep the energization of coils of solenoids PR and PR' at the same relative value regardless of the number of units making up the consist, since each of the coils of solenoids PR' in the trailing units is energized by the leading unit.

The solenoid PR forms a part of an electro-hydraulic control valve 34 and its core is operatively connected to a movable portion of the valve. Also forming a part of the electro-hydraulic brake control valve 34 and having a core operatively connected to the movable portion of the valve is a solenoid MG. The coil of the solenoid MG is connected across the traction motor armature M4 and its dynamic braking grid R4 by the conductors 26 and 28.

Returning now to the electro-hydraulic control valve 34, it may be seen that this valve controls hydraulic pressure from the engine E through a conduit 32 to a vane motor designated generally by the reference numeral 30. The vane motor 30 consists of a pair of oppositely disposed hydraulic pressure conduits 36 and 38, a circular housing 37 and a rotatable vane 31. One pair of ends of the conduits 36 and 38 are connected to the control valve 34 and the other pair of ends are connected to the housing 37 to supply pressure to opposite sides of the vane 31. The vane 31 is operatively connected to an arm 43 of a variable resistance VR, which is in electrical circuit with the battery field BF and the battery BAT.

Referring now to the battery BAT, the battery field BF and the variable resistor VR, the particular circuits for energizing the battery field BF will be described. Beginning with the positive side of the battery BAT, one of the circuits includes the conductor 2, a conductor 40, a conductor 42, the resistance in the variable resistor VR, a conductor 50, the conductor 20, and a return to the negative side of the battery. Another circuit in parallel with the circuit just described and running from the positive to the negative side of the battery BAT includes the conductor 2, the conductor 40, the conductor 42, a fixed resistance FR2, a conductor 51, a conductor 46, a second fixed resistance FR1, a conductor 48, the conductors 50 and 20, and a return to the negative side of the battery BAT. A bridge circuit containing the battery field BF and connecting the two parallel circuits is also shown. This bridge circuit begins at a junction formed by the conductors 46 and 51, includes the conductor 46, the battery field BF, a conductor 44, and ends with the movable arm 43 of the variable resistor VR.

The operation of the new improved dynamic braking system is as follows:

When a single locomotive unit is in power, the braking lever BL is in the position POW. Now, if for some reason, i. e. such as descending a grade, the engineer wished to utilize dynamic braking, he operates the lever BL in a counterclockwise direction. As the lever BL moves counterclockwise, the first operative position it is moved through is the position OFF. In this position no more power tractive effort is supplied to the locomotive wheels and the field loop switches FL1, FL2, and FL3 are automatically closed in a well-known manner. Closing these field loop switches completes the field loop circuit and allows current to flow from the positive side of the battery BAT through conductor 2, all of the resistance of the braking rheostat BR, conductor 4, unit selector switch SW, conductor 6, the now closed contacts of field loop switch FL2, conductor 8, the coil of solenoid PR, conductors 10 and 12, field loop switch FL3, conductors 14, 16 and 18, field loop switch FL1, conductor 20, and a return to the negative side of the battery BAT. This circuit energizes the coil of the solenoid PR. However, with all the resistance of the brake rheostat BR in the circuit, this energization of solenoid PR is insufficient to overcome the action of a spring 90 and the movable portion of the valve 34 is held in an extreme position with an extension of the movable valve portion abutting a stop 92. This position of the valve allows hydraulic pressure from the engine E to maintain the vane 31 in its extreme counterclockwise position and the arm 43 of the variable resistance VR in the maximum resistance position.

Returning to the brake lever BL it will be seen that, as it continues counterclockwise, it passes through the position B. In the B position the resistor grids R1, R2, R3 and R4 are connected across their respective armatures and the battery field BF is disconnected from its power circuit and connected in dynamic braking circuit as shown in the diagram. These changes in circuits are made in a well-known manner which is old in the art and therefore merit no further discussion here.

When the battery field BF is connected in circuit in the manner illustrated, it will be observed that current may now flow from the positive side of the battery BAT through conductors 2, 40, 42, all of the resistance of rheostat VR, conductors 50 and 20, and a return to the negative side of the battery BAT. Current may also flow through conductors 2, 40, 42, fixed resistance FR2, conductors 51 and 46, fixed resistance FR1, conductors 48, 50 and 20, and a return to the negative side of the battery. Due to the choice of magnitudes of fixed resistances FR1 and FR2 and the maximum resistance of the resistor VR, a difference of potential now exists between the junction point of conductors 46 and 51 and the tip of arm 43 positioned at the point of maximum resistance. The potential at the arm tip, however, is slightly higher than at the junction point of conductors 46 and 51. This causes a small current to flow through the arm 43, conductor 44, the battery field BF, and conductor 46. The flow of this current through the battery field is in the direction of the small arrow located just above the battery field BF, and is in opposition to the normal flow of current through the battery field both in power and normal dynamic braking. It is this current, indicated by the small arrow, that quickly reduces and eliminates the residual voltage in the main generator.

Immediately following the connection of the battery field in the manner just described, the fields for traction motor armatures M1, M2, M3 and M4 are connected as illustrated in the schematic diagram. This is also carried out in a well-known manner by the means which connected the resistor grids across the traction motor armatures. The system is now in condition for active dynamic braking effort.

Dynamic braking effort is accomplished by continuing the counterclockwise movement of braking lever BL into the braking range EF. When this takes place the resistance of the variable resistor BR is reduced in the circuit causing the coil of solenoid PR to be further energized, thereby causing the movable part of valve 34 to move against the action of spring 90. This movement allows hydraulic pressure to be supplied through conduit 38 to turn vane 31 and arm 43 in a clockwise direction, thereby changing the resistance in the battery field circuit. As the arm 43 moves clockwise a very small amount, the difference of potential between the tip of arm 43 and the junction point of conductors 46 and 51 goes to zero. Upon continued clockwise movement of the arm 43, a difference of potential again exists between these points with the higher potential now being at the junction point between conductors 46 and 51. This new difference in potential again causes a current to flow through the battery field BF, but it is now in the direction of the large arrow shown in the diagram just below the battery field. As the magnitude of the current flowing through the battery field BF in the direction of the large arrow increases, the field excitations for the generator and traction motor armatures increases. These greater field excitations cause more current to flow through the resistor grids R1, R2, R3 and R4. More current also flows through the coil of solenoid MG by means of conductors 26 and 28. When this latter current reaches a certain magnitude solenoid MG will cause the movable part of valve 34 to move against the action of solenoid PR and allow hydraulic pressure to be supplied through conduit 36 to the other side of vane 31, effecting movement of the variable resistance VR. The movable part of the valve 34 will fluctuate back and forth until a balanced condition between solenoids MG and PR is achieved. It may at once be perceived that the current in the resistor grids is balanced against the brake lever setting in a manner completely independent of locomotive speed. In other words, no change of setting need be made with changes in locomotive speed and the maximum grid current will be determined by the maximum braking position of lever BL in the range EF.

Referring now to the portion of the schematic diagram designated generally by T and taking it in conjunction with the lead unit L, it will be demonstrated as to how these units L and T can be connected in multiple.

The trailing unit T is similar to the lead unit L and comprises a diesel engine E' driving a main generator G'. The generator G' is excited by a battery field BF', which is in electrical circuit with a battery BAT', a pair of fixed resistances FR1', FR2' and a variable resistor VR'. Connected in series across the generator G' are fields F1', F2', F3' and F4' for traction motor armatures M1', M2', M3', M4', respectively, and connected across the armatures M1', M2', M3', M4' are resistor grids R1', R2', R3', and R4'. In electrical circuit with the resistor grid R4' by means of conductors 91 and 93 is the coil of a solenoid MG'. The solenoid MG' forms part of an electro-hydraulic valve 94. This electro-hydraulic valve 94 controls a vane motor 96 operatively connected to the variable resistance VR'.

When two units L and T are used together and are connected by the train-line connections 60 and 62, the field loop switch FL1 and the field loop switch FL2 of the L unit will be closed, but field loop switch FL3 of the L unit will remain open. On the T unit, field loop switch FL1' and FL2' will remain open, but field loop switch FL3' will be closed. These switches are opened and closed in a well-known way, which will not be described further here. Since L is the leading unit, the unit selector switch SW will be placed in position 2 indicating that two units are connected in multiple. This will decrease the amount of resistance in the field loop circuit at one point, namely, between the selector points 1 and 2 on the selector switch SW, but an equal amount of resistance will be added to the circuit due to the coil PR' on the T unit. It will now be seen that complete control is retained in the L unit and the controls of the T unit are isolated by the open field loop switch FL2'. When this switch is open no current can flow from the positive side of the battery BAT' in the T unit through the conductor 98, the variable resistance BR', conductor 100, the unit selector switch SW', or the conductor 102.

When the brake lever BL is moved to the position "off" in the L unit, current may then flow from the positive side of the battery BAT, through conductor 2, the variable resistance BR, conductor 4, the unit selector switch SW, conductor 6, the field loop switch FL2, conductor 8, the coil of solenoid PR, conductor 10, the train-line conductor 64, train-line conductor connection 62, train-line conductor 66, conductor 68, the coil of solenoid PR', conductor 70, train-line conductor 72, conductor 74, the now closed contacts of the field loop switch FL3', conductor 76, train-line conductor 78, train-line connection 60, train-line conductor 16, conductor 18, through the closed contacts of the field loop switch FL1, conductor 20, and back to the negative side of the battery. Current will also flow from the battery BAT' in the T unit through the battery field BF' in a similar manner to that described for the L unit. It should also be noted that the grid current from traction motor M4' in the T unit is balanced against the brake lever setting in the L unit. While in the example shown only two units are connected in multiple, it may be readily appreciated that three or four units could also be connected in a similar manner to that just described.

I claim:

1. Apparatus for dynamic braking systems on electrically driven vehicles comprising a generator having a main field to provide excitation therefor, a traction motor connected to operate as a generator and in electrical circuit with a resistance and excited by said generator, means sensitive to the current in said resistance and operatively connected to valve means located in a communicating passage between a hydraulic pressure source and a hydraulically operated vane motor, a vane for said vane motor operatively connected to electrical means to vary the field excitation of said generator and said traction motor and thereby limit the current in said resistance, said valve means acting to control the action of said hydraulic pressure upon said vane, and control means including a manually operated braking resistor and electrical means connected to said valve means to bias said valve means in opposition to said current sensitive means, the setting of said braking resistor determining the magnitude to which said current is to be limited in said resistance.

2. Apparatus for dynamic braking systems on electrically driven vehicles comprising a voltage source, a generator having a main field in electrical circuit across said source, means for turning said generator, a plurality of traction motors each connected to operate as a generator and each having an armature in electrical circuit with a resistance, a field for each of said traction motors in electrical circuit with said generator and excited by said generator, and means to limit the amount of current flowing through each of said resistances regardless of vehicle speed, said means including variable and fixed impedance in electrical circuit with said main field and said source, solenoid means in parallel electrical circuit with one of said resistances across one of said traction motor armatures and operatively connected to valve means located in a communicating passage between a hydraulic pressure source and a hydraulically operated vane motor to bias said valve means in one direction, a vane for said vane motor operatively connected to said variable impedance for varying said impedance, the field excitation of said generator and the field excitation of said traction motors, and control means including a manually operated variable braking resistor and a second solenoid in electrical circuit with said voltage source, said second solenoid being operatively connected to said valve means to bias said valve means in opposition to the bias of said first mentioned solenoid to thereby establish the magnitude to which the current flowing through said resistance is to be limited as determined by the setting of said variable braking resistor.

3. Apparatus for controlling the grid currents of dynamic braking systems of electrically driven vehicles including a generator having a main field to provide excitation therefor and a traction motor connected to operate as a generator and in electrical circuit with a dynamic braking resistance grid and excited by said generator comprising a hydraulic pressure source, a hydraulically operated motor, electrically controlled valve means sensitive to the current in said grid located in a communicating passage between said pressure source and hydraulically operated motor, said hydraulically operated motor being connected to electrical means to vary the field excitation of said generator, and manually controlled means operable to bias said valve means in opposition to said current sensitive means.

References Cited in the file of this patent

UNITED STATES PATENTS

| | | |
|---|---|---|
| 1,596,255 | Stephenson | Aug. 17, 1926 |
| 2,175,820 | Baston | Oct. 10, 1939 |
| 2,271,984 | McNairy et al. | Feb. 3, 1942 |